Dec. 18, 1934.　　　　O. C. KREIS　　　　1,984,836
DIESEL ENGINE
Filed Nov. 27, 1931　　　2 Sheets-Sheet 1
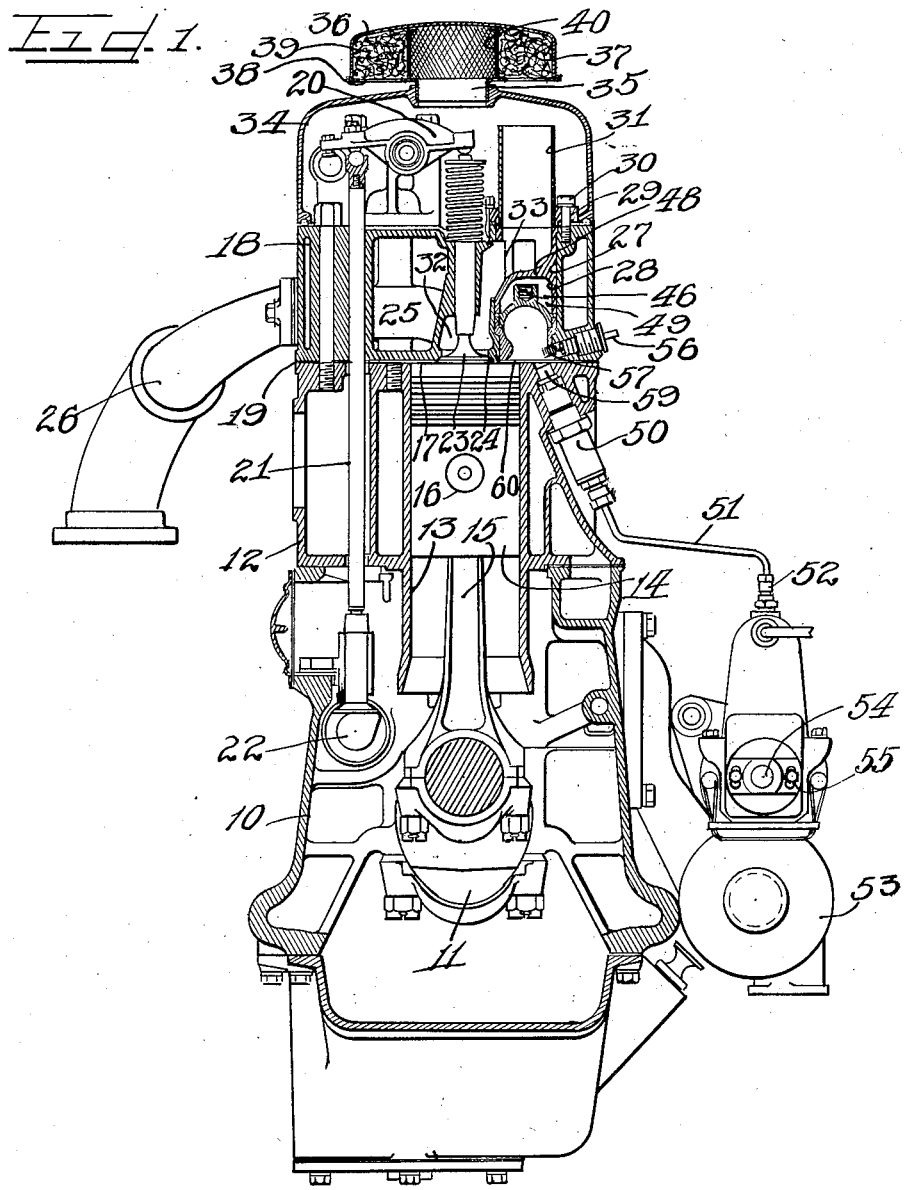
INVENTOR.
Oscar C. Kreis
BY
ATTORNEYS.

Dec. 18, 1934.  O. C. KREIS  1,984,836
DIESEL ENGINE
Filed Nov. 27, 1931  2 Sheets-Sheet 2
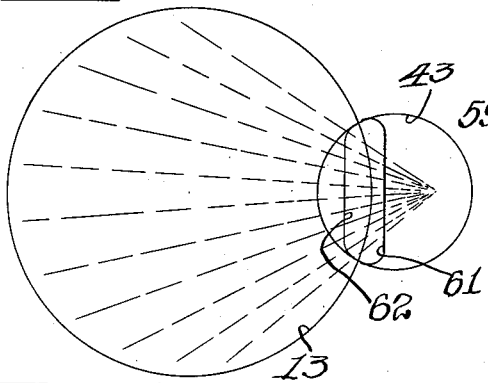
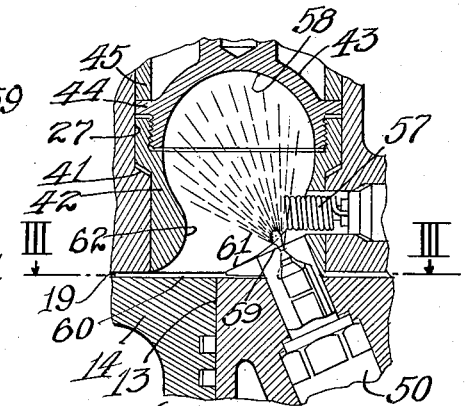
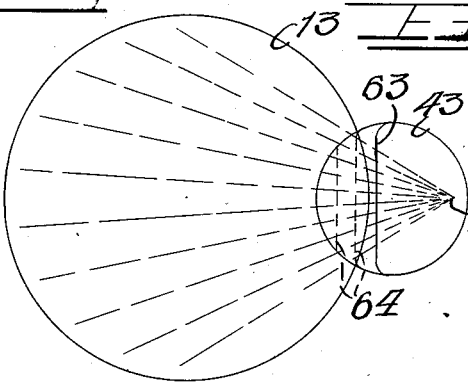
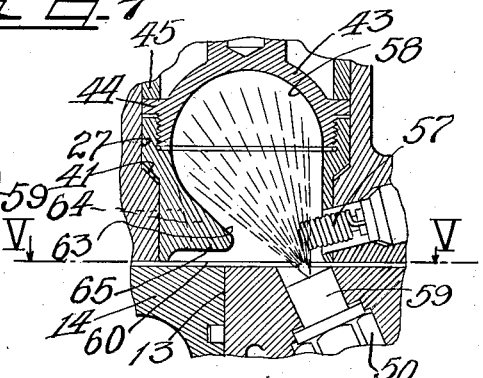
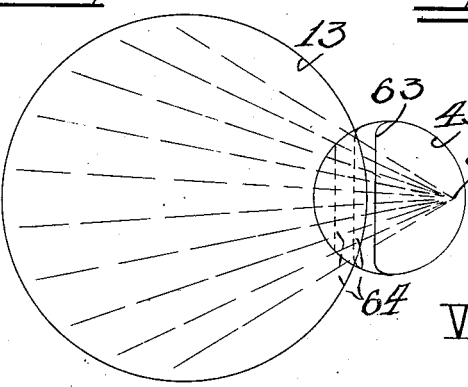
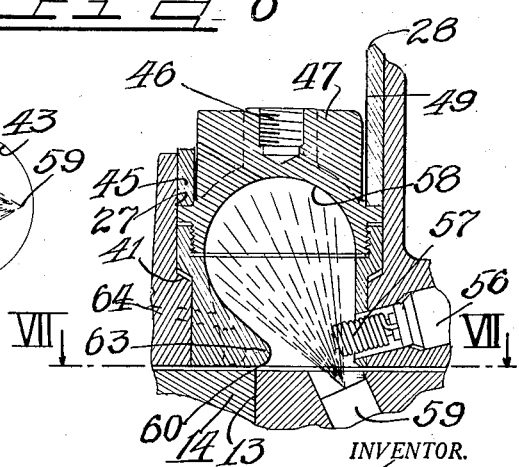
INVENTOR.
Oscar C. Kreis
BY
ATTORNEYS.

Patented Dec. 18, 1934

1,984,836

UNITED STATES PATENT OFFICE 1,984,836

DIESEL ENGINE

Oscar C. Kreis, South Bend, Ind., assignor to The Studebaker Corporation, South Bend, Ind., a corporation of New Jersey Application November 27, 1931, Serial No. 577,492

3 Claims. (Cl. 123—32)

This invention relates to internal combustion engines of the compression ignition or Diesel type, and has special reference to an engine of the pre-combustion chamber type affording a selective control of the compression, fuel injection, turbulence direction and velocity of transfer from the pre-combustion chamber to the engine cylinder.

It is an important object of this invention to provide an improved compression ignition engine suitable for automotive purposes and hence necessarily capable of flexible and high speed operation under widely varying conditions of fuel and load. To this end, I provide a separate substantially spherical pre-combustion chamber design easily accessible without dismantling the head structure, and capable of wide variations in volume and outlet shape to control the conditions of transfer to the engine cylinder to suit various fuels, thus controlling the pressure rise and combustion characteristics of the engine. By so providing a removable pre-combustion chamber, a very flexible arrangement of its parts can be made which can be modified to control a wide range of turbulence and restriction of transfer to the engine cylinder, to suit varying grades or viscosities of fuel oils which affect the spray penetration and injector discharge rate as well as the fuel burning rate in the pre-combustion chamber prior to the transfer to the engine cylinder.

It is also an important object of this invention to provide an improved engine of the class described wherein a separate cylinder head carries the usual air inlet valve, valve seat and air inlet passage, a portion of the air inlet passage being formed in separately removable member associated with a chamber provided in the head for the pre-combustion chamber casing, the removable member serving to hold the pre-combustion chamber casing in position and serving to provide air cooling for the upper part of said casing, this air cooling effect being under control and permitting the maintenance of a higher operating temperature in the pre-combustion chamber because of a dead air pocket formed between the member and the casing. The controlled air cooling of the pre-combustion chamber permits operation at a lower compression pressure and prevents carbonization of the surface of the chamber.

It is another important object of this invention to provide an easily accessible and removable pre-combustion chamber design wherein the material of the chamber can be chosen for its non-oxidizing and non-warping characteristics at the high operating temperatures required since the balance of the engine structure can thus be chosen for strength and wearing qualities at the normal temperatures attained in the other engine parts.

It is also an object of this invention to provide an improved engine of the class described wherein a substantially spherical pre-combustion chamber can be utilized and thus obtain a chamber suitable for use with a conical fuel injection spray which assists in obtaining a more complete mixture and burning of the fuel without resort to minute multiple orifices or special designs of fuel sprays.

It is a further object of this invention to provide an improved pre-combustion chamber and fuel injector arrangement wherein the fuel leads from the fuel metering pumps are inclined upwardly to an injector also upwardly inclined to avoid air traps, the injector discharging into the pre-combustion chamber in such a manner that the deposition of liquid fuel on relatively cool surfaces is avoided, thus providing clean burning with a minimum tendency to carbonization of adjacent metal surfaces.

It is another object of this invention to provide an improved engine of the class described that will be relatively simple and easy to assemble and service and that can be adapted to a variety of installations with the minimum of specialized variations.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical cross section through an engine embodying the features of this invention, the particular pre-combustion chamber there shown being designed to control the direction of the combustion turbulence during the period of mixture transfer to the engine cylinder.

Figure 2 is a fragmentary enlarged detail of the pre-combustion chamber of Figure 1 as modified for further control of the direction of turbulence during the mixture transfer.

Figure 3 is a plan view of the transfer passage taken on the line III—III of Figure 2.

Figure 4 is an enlarged detail similar to that of Figure 2 wherein the pre-combustion chamber has been altered to control the turbulence velocity during transfer, the control variations being indicated by the dotted lines.

Figure 5 is a plan view of the transfer passage taken on the line V—V of Figure 4.

Figure 6 is an enlarged detail similar to Figures 2 and 4 wherein the pre-combustion chamber has been modified to provide high turbulence and transfer restriction, further modification being shown by the dotted lines.

Figure 7 is a plan view of the transfer passage taken on the line VII—VII of Figure 6.

As shown:

The engine chosen to illustrate my invention comprises a crankcase 10 suitably journaling a crankshaft 11 and supporting a water cooled cylinder block 12 containing a cylinder bore 13. A piston 14 is reciprocated in the cylinder by means of a connecting rod 15 journaled on the crankshaft at one end and in the piston by a wrist pin 16. The piston 14 is intended to rise approximately flush with the top surface 17 of the cylinder block when it reaches its top dead center. A water jacketed cylinder head 18 is bolted to the top surface of the cylinder block, and, as shown, is not provided with a recessed combustion chamber space over the piston, sufficient actual operating clearance being provided by a gasket 19 interposed between the head and the block.

The cylinder carries suitable overhead valve operating mechanism on its top surface, including a rocker arm 20 and a push rod 21 operated from a camshaft 22, the rocker arm operating an air inlet valve 23 having a seat 24 in the lower surface of the head. While similar mechanism is, of course, provided for an exhaust valve, only the cored exhaust passage 25 and manifold 26 are indicated in Figure 1.

A passage 27 is formed through the head in offset, but slightly overlapping relationship, to the edge of the cylinder bore, and the upper part of this passage is occupied by a passaged member 28 held down by a flange 29 and bolts 30. A tube 31 forms an upstanding air intake protecting against the delivery of excessive oil thereto from the valve mechanism. The passage 27 opens at one side into an inlet port 32 about the stem of the inlet valve and in communication with the valve seat, the air inlet 28 having suitable side ports or openings 33 in communication with the port 32 so that the path of the inlet air is through the tube 31, passaged member 28, ports 33 and 32 to the valve seat 24.

A cover or housing 34 is provided for the valve operating mechanism and a top air inlet opening 35 is provided therethrough, an air filter 36 being mounted above the opening 35. As shown, this air filter comprises a shell having an annular chamber 37 with bottom inlets 38, the chamber containing suitable filtering material 39. An inner perforated shell 40 defines the annular chamber and is of approximately the size of the air inlet opening 35.

The lower end of the passage 27 in the cylinder head is restricted to form an inclined shoulder 41 on which a mating shoulder of the lower part 42 of a pre-combustion chamber casing seats against a suitable gasket. The pre-combustion chambers of the various modifications shown are externally alike; variations referring to their internal shapes, which will be referred to hereinafter in more detail. A cover member 43 for the lower part of the chamber casing is threadedly engaged therewith and is provided with a peripheral shoulder 44 on which a depending flange 45 on the air inlet member 28 bears to hold the casing firmly seated. The cover member also carries a central threaded boss 46 into which a suitable tool can be screwed after removal of the member 28, to permit removal of the complete casing from above without disturbing the cylinder head or valve operating mechanism. The cover member 43 may also carry fins 47 as shown in Figure 6 which is intended for an air cooled engine as the bottom closure 48 of the air inlet member 28 is then omitted to permit a direct air flow over the top of the cover member. The bottom closure 48 can also be varied to change the dead air space 49 above the cover member 43 and thus further control the heat transfer to the inlet air and consequently the operating temperature of the pre-combustion chamber, which, especially in the cover member is desirably sufficiently high to assist vaporization of the injected fuel and to reduce the probability of carbonization.

Because of the high temperature to which the casing parts 42 and 43 are subjected in operation, it is especially desirable to form these parts from non-oxidizing and non-warping material separate from the material of the cylinder head which does not have to withstand such temperatures.

An upwardly discharging injection valve 50 is so mounted in the cylinder block as to discharge a conical spray into the pre-combustion chamber, and is fed fuel oil at properly timed intervals through upwardly inclined tubing 51 from a fuel pump 52 shown associated with a cooling water circulating pump 53. Since the path of the fuel oil from the pump to the pre-compression chamber is always upwards, there is no possibility of vapor or air lock in the fuel line. The fuel pump details have been omitted for the sake of simplicity, but the pump is driven from a shaft 54 in turn driven in timed relationship with the crankshaft, the pump timing being adjustable by means of the collar 55 shown on the pump in Figure 1.

In order to facilitate starting a cold engine a glow plug 56 has been provided which carries an electrical resistance element 57 projecting into the pre-combustion chamber adjacent the boundary layers of the fuel spray from the injector.

In general, the various internal forms of the pre-combustion chamber comprises a semi-spherical surface 58 in the cover member 43, with an approximately inverted and inclined conical shape for the lower member 42, the apex of the cone substantially coinciding with the injector nozzle 59. A transfer passage 60 is provided through the side of the cone adjacent the cylinder bore, and Figs. 1, 4 and 6 differ in the shape of this transfer passage, while Figure 2 adds a curved fairing surface 61 oppositely disposed relative to the transfer passage 60 which is apertured for the injector nozzle and glow plug.

In Figures 1 and 2 a control of the direction of the turbulent flow from the pre-combustion chamber is obtained by rounding off the edge 62 of the lower casing member 42 adjacent the transfer passage, Figure 2 going farther by providing the fairing surface 61 which more positively directs the flow from the chamber in a direction substantially parallel to the piston top.

In Figures 4 and 6 the size of the transfer passage is restricted by carrying the wall 63 of the conical surface towards the edge of the cylinder bore, the dotted lines 64 in each figure showing progressive steps which have been employed by applicant in determining the preferred embodiment shown in full lines. In Figure 4 the wall 63 is cut away underneath at 65 to prevent too great a restriction of the transfer passage although the restriction serves to control the turbulence velocity. In Figure 6 on the other hand a high turbulence as well as transfer restriction is obtained thus slowing down the pressure rise in the power cylinder. Figure 6 also differs from the preceding modifications in that the bottom closure 48 of the inlet member 28 is omitted thus eliminating the insulating effect of the dead air space provided in Figures 1, 2, and 4.

In the operation of an engine embodying the features of this invention, air is drawn into the engine cylinder through the valve 24 on the suction stroke of the piston, and on the following compression stroke thereof a large part of this air is transferred into the pre-combustion chamber. Fuel injection is timed for slightly before top dead center, depending somewhat on the engine speed, and the compression pressure and temperature is sufficiently high to cause ignition of the fuel sprayed into the chamber. The area of the chamber is so concentrated that intimate mixture and dispersion of the fuel spray is obtained. The ignition of the fuel causes a further pressure rise which causes the burning mixture to be discharged into the engine cylinder to drive the piston on its power stroke, the downward movement of the piston increasing the relative pressure differential and causing a further discharge from the pre-combustion chamber until the opening of the exhaust valve substantially releases the pressure of the combustion gases.

The repeated ignition of the charge in the pre-combustion chamber results in rapid heating of the casing therefor, which heating is controlled by the surrounding cylinder head as regards the lower part of the casing while the upper part is located in a dead air space in turn cooled by the incoming inlet air supply. In an air cooled engine it may be advisable to eliminate the dead air space as shown in Figure 6 because of the higher temperatures in such an engine. By a suitable adjustment of this dead air space, the temperature of the cover member 43 can be controlled and held at a sufficiently high point to assure satisfactory ignition without the formation of carbon inside the casing.

It will thus be seen that I have invented an improved compression ignition engine of the pre-combustion chamber type wherein I am enabled to closely control the operating conditions to suit varying qualities of fuel and varying operating conditions.

I am aware that many changes may be made, and numerous details of construction may be varied through a wide range without departing from the principles of this invention, and I, therefore, do not purpose limiting the patent granted hereon, otherwise than necessitated by the prior art.

I claim:

1. In an internal combustion engine, removable air inlet means, and removable means comprising a pre-combustion chamber accessible upon removal of said air inlet means, said inlet means serving to retain said removable means in operative position.

2. A cylinder and combustion chamber construction for internal combustion engines, comprising a cylinder head member having a suitable inlet valve seat and inlet passage therein, a removable casing member mounted in a pocket in said head in communication with the interior of the engine cylinder, said casing member defining a spherical pre-combustion chamber containing approximately the whole of the clearance volume for the engine cylinder, an inwardly extending projection on one side of said casing to provide a restriction between said pre-combustion chamber and said cylinder, and removable means forming a part of said inlet passage for holding said casing member in position, said removable means being so disposed relative to the casing member as to define a dead air space therebetween to assist in the control of the working temperature of the casing member.

3. In an internal combustion engine of the compression-ignition type having a cylinder, a cylinder head casing, an air inlet passage in said casing, a valve seat in said passage, and an upwardly directed fuel injection valve opening into a laterally extending portion of said passage; a removable casing member mounted in said laterally extending portion overlying said fuel injection valve and a portion of said cylinder to provide a pre-combustion chamber in open communication with said cylinder having a capacity comprising approximately the entire clearance volume for said cylinder, a flared portion in the bottom of said removable casing member adjacent to said fuel injection valve, whereby fuel spray from said fuel injection valve will enter directly into said pre-combustion chamber without coming in contact with any metal surface, an inwardly extending projection in said casing adjacent to said air inlet valve seat to provide a restriction between said pre-combustion chamber and said cylinder to control the flow of expanding gas from said pre-combustion chamber into said cylinder, said projection being rounded to facilitate the flow of air from said cylinder into said pre-combustion chamber.

OSCAR C. KREIS.